United States Patent [19]

Brawley

[11] 4,060,290
[45] Nov. 29, 1977

[54] BEARING COMPONENT AND METHOD OF MAKING SAME

[76] Inventor: Thomas Scott Brawley, 152 Green Countrie Court, 7841 Ridge Ave., Philadelphia, Pa. 19128

[21] Appl. No.: 691,083

[22] Filed: May 28, 1976

Related U.S. Application Data

[63] Continuation-in-part of Ser. No. 456,139, March 29, 1974, Pat. No. 3,960,419.

[51] Int. Cl.² .............................................. F16C 33/58
[52] U.S. Cl. ................................. 308/216; 29/148.4 R
[58] Field of Search ........... 308/193, 195, 196, 207 R, 308/212, 213, 214, 216; 29/148.4 R

[56] References Cited

U.S. PATENT DOCUMENTS

| 2,447,928 | 8/1948 | Bergstrom | 308/214 |
|---|---|---|---|
| 2,615,767 | 10/1952 | Wallgren | 308/214 |
| 3,578,831 | 5/1971 | Scheitele | 308/214 |
| 3,720,450 | 3/1973 | Dominik | 308/214 |
| 3,767,278 | 10/1973 | Knowles | 308/214 |
| 3,782,795 | 1/1974 | Richey et al. | 308/214 |

Primary Examiner—Richard A. Bertsch
Attorney, Agent, or Firm—DeLio and Montgomery

[57] ABSTRACT

An anti-friction tapered roller bearing comprising a generally cylindrical inner race body portion having an outwardly facing frusto-conic bearing surface on said inner body portion constituting the main bearing surface of the inner ring of a tapered roller bearing and a generally cylindrical outer race body portion having an inwardly facing frusto-conic bearing surface on said outer body portion, with flanges or ribs extending radially at one or both ends, at least one such rib being constituted integrally with the body portion and being formed by known forming processes from end material of the body portion of the bearing component in such a manner that the fiber flow of the body and the integral rib results in minimal exposure of fiber ends on any bearing surface, and the method of manufacturing such a bearing component by specially forming at least one end of the body portion.

12 Claims, 7 Drawing Figures

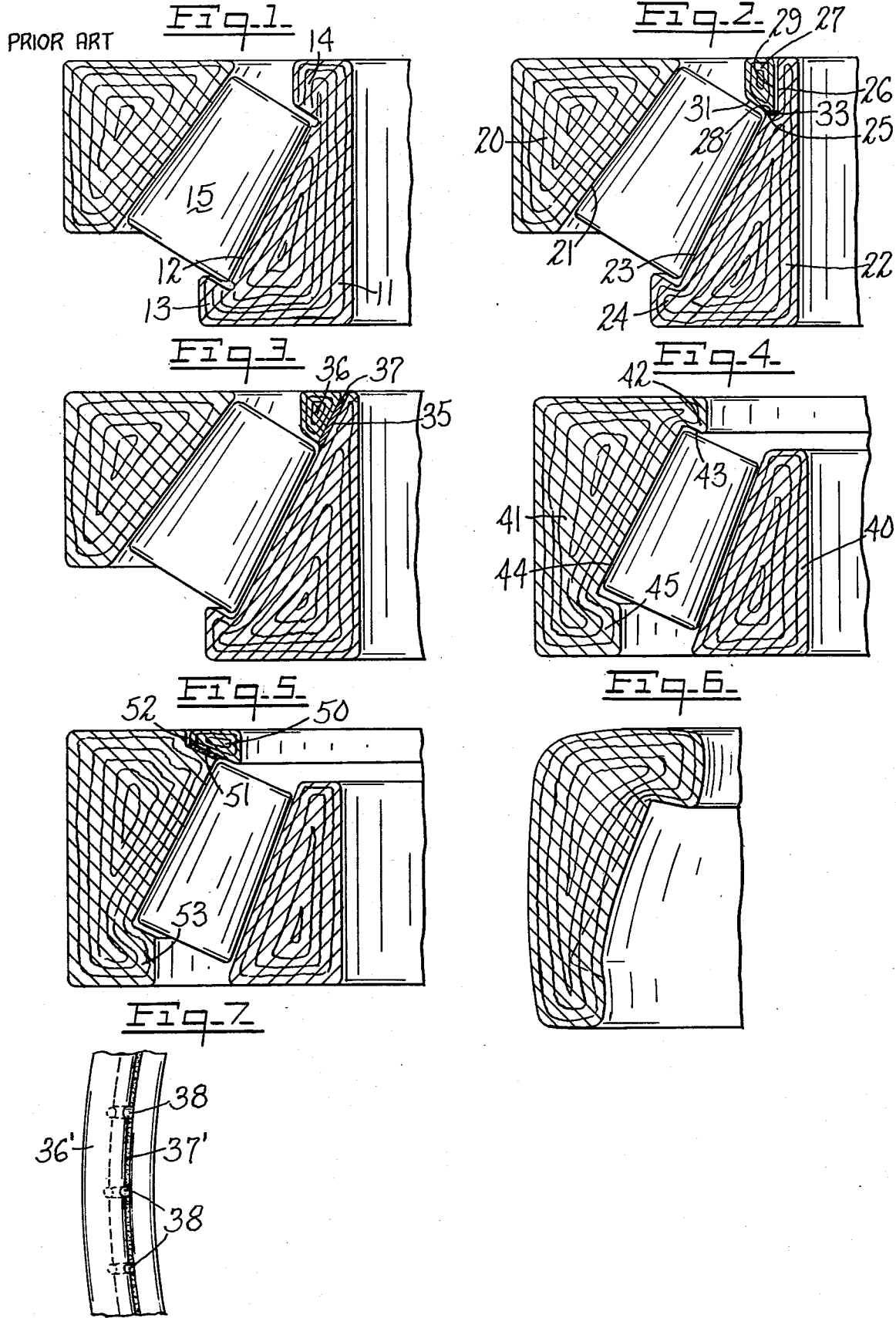

BEARING COMPONENT AND METHOD OF MAKING SAME

This is a continuation in-part of Ser. No. 456,139, filed Mar. 29, 1974, now U.S. Pat. No. 3,960,419, June 1, 1976.

This invention relates to anti-friction tapered roller bearings and the method of manufacturing same, referring particularly in the present case to parallel and continuous fiber orientation throughout each bearing surface and also to the design of the tapered roller bearings relative to lubrication flow at high speeds for inner and outer tapered roller bearing rings. The bearing components comprise formed inner and outer generally cylindrical body portions, one component of which has a thrust rib formed at least on the larger diameter end of said component.

BACKGROUND OF THE INVENTION

Conventional methods of manufacturing bearing components such as inner and outer rings or races (e.g. from bar or tube stock) have proved to be a relatively slow and costly process. Efforts have been made however to adapt welding techniques to the manufacture of such components. Examples of these efforts may be found in the U.S. Pat. No. to Morrison, 3,229,353 and Cavagnaro, 3,522,644; and see also the U.S. Pat. No. to Moore, 3,746,722. In each of the above patents the weld seam bisects the rolling surface of the bearing component. The slightest flaw in the metallurgical quality of the rolling surfaces may cause premature bearing failure, and weld placed in the rolling surface is exposed to stress and fatigue factors which may limit the life of an otherwise well designed, high quality bearing, particularly in heavy duty applications.

Another problem resulting from the presence of a weld seam in the rolling surface is the need for grinding or machining the surface to remove excess welding material and to correct possible macrodeformations, all at substantially increased costs.

More specifically tapered roller bearings have always been restricted to low speed applications. Such bearings, however, have been relied upon and have performed commendably in the heaviest of load carrying applications. Bearing designers, in the past, have always designed these bearings so that the main portion of the load, whether radial or axial, is directed onto the tapered main bearing surfaces of the inner and outer rings rather than the thrust rib or larger diameter rib.

Although the industry has been aware of the importance of properly orienting metallurgical fiber, the industry has devoted its attention only to the fiber flow of the tapered main bearing surfaces, no attention being given to the fiber flow of the thrust rib. When tapered roller bearings perform in high speed application, however, centrifugal force causes the tapered rollers to climb the taper of the bearing. As a result, the tapered rollers are thrust with substantial load against the thrust rib which normally has end fiber exposed on into the direction of the load. A lack of concern has been shown for the amount of load exerted by the centrifugal forces of the heels of the tapered rollers against the thrust rib. As a result, the fiber flow of the thrust rib has been ignored. It appears, however, that the load which is placed upon the thrust rib involves considerably more friction than the load which occurs throughout the taper of the bearing. This is due to the fact that the rolling motion throughout the main tapering bearing surface involves a largely non-frictional rolling motion, while the contact of the heels of the tapered rollers, against the thrust rib, involves only a rubbing motion. This latter fact seems to have eluded those who are skilled in this art. Although bearing loads are substantially greater on the tapered surfaces of the bearing, the heat generation, which directly affects bearing life, is substantially less, due to a nonfrictional rolling motion, than the heat generated by the rubbing motion throughout the thrust rib. The result is that there is a substantial build-up of heat in the area of the thrust rib at high speeds. A fracture is likely to occur in this structurally weak region. Recognition of the fact that there is considerable frictional resistance to the rolling motion of the heels of the rollers against the thrust rib presents a variety of problems which are uncommon, or even non-existant, in all other anti-friction rolling bearings which involve non-frictional rolling contact throughout their respective load carrying surfaces.

Upon consideration of the aforementioned, it is indeed significant that end grain is exposed at the bearing surface of the thrust rib. It is in this region, due to a number of reasons, that impurities tend to appear. Under substantial loading, the particles become forced into the fiber of the thrust rib thus serving as a wedge to split the grain of the steel along the direction of end fiber. A fracture point is therefore established. The implementation of improved lubrication, although helpful in reducing heat build-up does not correct the initial cause of fracture. By exposing the end of the fiber, the grain becomes more vulnerable to fracture. In the words of NASA (NASA TR R-60, page 9), "most materials have less static strength in a transverse (to fiber) direction".

For a further discussion of fiber orientation see the parent application, Ser. No. 456,139, now U.S. Pat. No. 3,960,419.

Recognition of the importance of fiber running parallel to the load carrying surface of the thrust rib is only part of the problem in correcting the design of the tapered roller bearings of the prior art. The problem resting at the base of the matter is to manufacture a bearing having this desirable fiber flow. In addition, there is also the manufacturing problem of obtaining parallel fiber flow in both the tapered main bearing surfaces and the thrust rib of the inner race. The nearest manufacturing operation which could be utilized to achieve parallel fiber orientation throughout both the tapered main bearing surface and the thrust rib of the conventional tapered inner race is a hot rolling operation commonly referred to as a ring rolling operation. In order to achieve a parallel orientation throughout these bearing surfaces it would be necessary to alter the fiber orientation of the raw material or forging in the thrust rib substantially in excess of 90°. Thus, the forming tool of the ring rolling operation would exert a shearing force with resultant severing of the fibers and exposure of the fiber ends.

In normal bearing applications there is evidence that a majority of bearing fatigue failures occur on the inner tapered race. The failures seem to occur at the ends of the bearing channel where machined recessed grooves have interrupted the fiber flow of the channel. These machined recessed grooves structurally weaken the inner race bearing surfaces at a point where end loading of the tapered rollers occurs. Spalling, due to fatigue, is common at the ends of the tapered main bearing channel. In addition, a stress point is established between the tapered main bearing surface and the thrust rib.

In high speed applications lubricant is directed away from the base and sides of the inner race channel as a result of centrifugal force. Once again, the inner race is subject to a high percentage of fatigue failures.

The problems inherent in conventional methods of manufacturing bearing components and particularly the outer races of tapered bearings can be most effectively overcome according to the present invention by die forming or forging the main body and roll forming the larger diameter end flange or rib. A seat may simultaneously be formed at the smaller diameter end to receive a flange or rib which is welded in place by means of a weld spaced from the bearing surface so that the surface requires a minimum of machining thereof.

The present invention concerns further the fiber orientation of the thrust rib which has been placed on the outer race of a heavy duty super-speed tapered roller bearing. By placing the thrust rib on the outer race, the fiber orientation of the raw materials may be altered so that the fiber flow of the bearing surfaces of the outer race is substantially parallel to both the thrust rib surface and the tapered main bearing surface. This novel fiber orientation is possible since the angle, to which the forging or raw material fiber flows, is altered less than 90°.

Practical embodiments of the invention are shown in the accompanying drawings wherein:

FIG. 1 represents a radial section of a tapered roller bearing with the orientation of grain indicated, both inner and outer rings having been processed by conventional methods using bar and/or tube stock;

FIG. 2 represents a radial section of a tapered roller bearing with the orientation of grain indicated, the rib at the smaller end of the inner ring being welded in a formed recess;

FIG. 3 represents a radial section of a tapered roller bearing, similar to FIG. 2 but with the rib weldment on a tapered surface;

FIG. 4 represents a radial section of a tapered roller bearing, with the orientation of grain indicated, the outer ring having been processed by forging or forming and roll formed to produce integral ribs at both ends, the inner ring being ribless;

FIG. 5 represents a radial section of a tapered roller bearing, as in FIG. 4 with the rib at the smaller diameter end formed separately and welded in a forged or formed seat;

FIG. 6 represents a radial section of a forged or formed outer ring, before roll forming of the main bearing surface and ribs.

FIG. 7 represents a detail end view of a portion of a bearing, according to FIG. 3, with oil grooves added to the separately formed rib.

Referring to the drawings, the inner ring 11 of the tapered roller bearing shown in FIG. 1 is made conventionally from bar stock or tubing, or by forging, to provide an annulus of the proper size and shape, and then machining the frusto-conic side to dig out a channel having the main bearing surface 12 with ribs 13, 14 at each end. The rib surfaces facing the tapered roller 15 present cut ends of the metal fiber which are most undesirable, as previously explained.

In the tapered bearing of FIG. 2 the outer ring 20 has a tapered bearing surface 21 but no flange or rib, while the inner ring 22 has a tapered bearing surface 23 bounded at its large diameter end by the integrally die-formed thrust rib 24. At the smaller diameter end the ring 22 is rabbeted to form a flat annular surface 25 and a cylindrical surface 26, a rib 27 being constituted by an annular cap having a mating interior surface 28, a roller retaining surface 31 and a cylindrical outer surface 29, the cap being separately formed to a size which will fit closely to the rabbet and being diffusion welded or resistance butt welded by autogenous weldment 33 which affects mainly the surfaces 25 and 28. The weldment 33 may extend to the adjacent mating surfaces 26 and 29 but must not affect to any material degree any part of the bearing surface 23.

In the modified structure of FIG. 3, the seat 35 for the smaller diameter rib is of frusto-conic form and the correspondingly shaped rib 36 readily aligns itself to the main body, during assembly. The rib is separately formed to a size which fits closely against the beveled seat and is welded in place by the autogenous weldment 37 which should not affect to any material degree any part of the main bearing surface.

Lubrication holes 38, running inward along the face of the rib 36' may interrupt weldment 37' at equidistantly spaced intervals and may be formed in the rib as a part of the die forming operation (FIG. 7).

While roller retaining ribs or flanges are most commonly formed on the inner ring or race of a tapered bearing, some efforts have been made to locate such ribs on the outer ring, one example being the Hampp et al. U.S. Pat. No. 3,689,127 showing a tapered barrel roller retained by a "retaining rim" which is fastened on the outer ring by gluing, soldering or welding; another example being the Dominik U.S. Pat. No. 3,720,450, similar to Hampp, with a separately formed thrust rib mounted in an undisclosed manner; and a third example being Published Patent Application B 507,661 wherein the thrust rib is formed integral with the "cap" or outer ring, apparently by machining.

In the bearing shown in FIG. 4, the inner ring or race 40 is plain, without flanges or ribs, and there is no problem in forming such an element with fiber flow parallel to the rolling surface, i.e., without exposed ends. The outer ring or race 41 can be forged or formed from suitable stock to a rough profile as indicated in FIG. 6 and can be further formed to provide the smaller diameter rib 42, with smooth parallel fiber flow on its surface 43, as well as on the adjacent portions of the main bearing surface 44. The final shaping of the latter surface to provide the thrust rib 45 can be effected by hot roll forming, the deformation of the fibers from the orientation of the raw material of forging shown in FIG. 6 to that indicated by broken lines being less than 90°, so that the fiber flow in the thrust rib remains parallel to the surface.

The alternative form of bearing shown in FIG. 5 is similar to that of FIG. 4 except that the smaller diameter rib 50 is separately formed as in FIGS. 2 and 3, and is welded in place, as shown at 51, in the rabbet 52. The thrust rib 53 at the larger diameter end is roll formed to provide the same parallel fiber flow shown and described in connection with FIG. 4.

From the foregoing it will be seen that thrust ribs can be forged or die formed on the inner ring of a tapered bearing if the smaller diameter rib is to be attached later, as by welding, according to FIGS. 2 and 3. If the thrust rib is formed on the inner ring by machining (FIG. 1) or by roll forming it involves deformation of fiber orientation through more than 90°, which interrupts the fiber flow and leaves ends exposed on the rib in a position of maximum stress, under load and at high speeds, contributing to early failure.

In the forging or forming and roll forming operation, illustrated in FIGS. 4 to 6, the roll forming step leaves the fiber orientation substantially continuous, parallel to the bearing surface of the rib and the main tapered bearing surface of the ring, thus insuring maximum durability. Such grain orientation strengthens the thrust rib against fracture or further deformation, and leaves stress resistant areas between the rib and main bearing surface, with no machined recessed groove, while permitting slight flexing of the inner structure in the thrust rib. Furthermore, lubricant supplied to the smaller end of the inner ring will lubricate that ring and be carried to the outer ring, where increasing speed of operation will result in increased lubrication, by centrifugal force, of the outer thrust rib area.

It will thus be seen that the objects set forth above, among those made apparent from the preceding description, are efficiently attained and, since certain changes may be made in carrying out the above method and in the article set forth without departing from the spirit and scope of the invention, it is intended that all matter contained in the above description and shown in the accompanying drawings shall be interpreted as illustrative and not in a limiting sense.

What I claim is:

1. A channel-anti-friction bearing component comprising a generally cylindrical body portion, a frusto-conic inwardly facing bearing surface on said body portion constituting the main bearing surface of the outer ring of a tapered bearing and an integrally formed rib having a surface defining the larger end of the channel, the metal flow in said body and said integrally formed rib running in directions which lie substantially parallel to the corresponding sides of the axial cross-section of the channel.

2. An anti-friction bearing component according to claim 1 wherein the metal flow in the body and integrally formed rib is substantially uninterrupted.

3. An anti-friction bearing component according to claim 1 which includes a second integrally formed rib having a surface defining the smaller end of the channel, the metal flow in said body and said second integrally formed rib running in directions which lie substantially parallel to the corresponding sides of the axial cross-section of the channel.

4. An anti-friction bearing component according to claim 1 wherein the metal flow in the body and integrally formed rib is substantially uninterrupted.

5. An anti-friction bearing component according to claim 1 which includes a separately constructed annular rib having a surface defining the smaller end of said channel, the body portion being formed with a seat adapted to receive said annular rib and said annular rib being attached to said seat by a weldment spaced from said main bearing surface.

6. A tapered anti-friction bearing comprising a first generally cylindrical body portion, a frusto-conic inwardly facing bearing surface on said first body portion constituting the main bearing surface of the outer ring of the tapered bearing, a second generally cylindrical body portion, a frusto-conic outwardly facing bearing surface on said second body portion constituting the main bearing surface of the inner ring of the tapered bearing, at least one of said body portions having an annular rib defining one end of a channel, the smaller diameter end of said outwardly facing bearing surface being ribless, and a plurality of tapered rollers disposed between said main bearing surfaces.

7. A tapered bearing according to claim 6 which includes an integrally formed rib having a surface defining the larger end of the channel on the first body portions.

8. A channeled anti-friction bearing component comprising a generally cylindrical body portion, a frusto-conic outwardly facing bearing surface on said body portion constituting the main bearing surface of the inner ring of a tapered bearing, a separately constituted annular rib having a surface defining the smaller end of said channel, the body portion being formed with a seat adapted to receive said annular rib and said annular rib being attached to said seat by a weldment spaced from said main bearing surface, and said seat being traversed in a generally axial direction by lubricant passages extending from the end of the ring to the channel.

9. The method of making an anti-friction bearing component which includes providing an annular body having the metal flow adjacent the interior surface substantially parallel to said surface, hot roll forming a tapered bearing surface on said interior surface and forming an integral thrust rib at the large diameter end of said bearing surface, while maintaining the metal flow in directions which lie substantially parallel to the main bearing surface and to the adjacent surface of the thrust rib.

10. The method according to claim 9 wherein the annular body is made by forging.

11. The method according to claim 9 wherein the annular body is made by hot or cold forming.

12. The method according to claim 9 which includes forming an integral rib at the smaller diameter end of said bearing surface.

* * * * *

UNITED STATES PATENT AND TRADEMARK OFFICE
CERTIFICATE OF CORRECTION

PATENT NO. : 4,060,290
DATED : November 29, 1977
INVENTOR(S) : Thomas Scott Brawley It is certified that error appears in the above-identified patent and that said Letters Patent are hereby corrected as shown below:

Column 1, line 29, patent no. "3,746,722" should be --3,748,722--. Column 1, line 60, after "exposed" insert --head--. Column 2, line 32, "vulernable" should be --vulnerable--. Column 5, line 28, "channel" should be --channeled--. Column 6, line 40, "large" should be --larger--.

Signed and Sealed this

Twenty-eighth Day of March 1978

[SEAL]

Attest:

RUTH C. MASON
Attesting Officer

LUTRELLE F. PARKER
Acting Commissioner of Patents and Trademarks